United States Patent [19]

Olusczak et al.

[11] Patent Number: 5,193,446

[45] Date of Patent: Mar. 16, 1993

[54] AUTOMATIC SPRAY RING FOR USE IN A JUICE FINISHER

[75] Inventors: Gregory J. Olusczak; Michael L. Suter, both of Lakeland, Fla.

[73] Assignee: FMC Corporation, Chicago, Ill.

[21] Appl. No.: 837,223

[22] Filed: Feb. 18, 1992

[51] Int. Cl.⁵ .......................... A23N 1/00; B30B 9/14; B08B 3/02; B08B 9/00

[52] U.S. Cl. ...................................... 99/486; 99/495; 99/510; 100/112; 100/117; 134/172; 210/143; 210/411

[58] Field of Search ................... 99/495, 509–513, 99/486, 487; 100/112, 126, 127, 117, 145; 134/172; 210/143, 411, 412, 108, 393; 241/74

[56] References Cited

U.S. PATENT DOCUMENTS

| | | | |
|---|---|---|---|
| 3,189,490 | 6/1965 | Scott | 134/172 |
| 3,370,527 | 2/1968 | Holbrook | 100/147 |
| 3,606,897 | 9/1971 | Tobin, III et al. | 134/170 |
| 3,650,282 | 3/1972 | Hollyer et al. | 134/172 |
| 3,930,513 | 1/1976 | Buchegger et al. | 134/172 |
| 3,933,519 | 1/1976 | Koch et al. | 134/172 |
| 4,457,223 | 7/1984 | Spinato | 99/510 |
| 4,585,019 | 4/1986 | Jacobson | 134/57 R |
| 4,665,816 | 5/1987 | Waters et al. | 99/504 |
| 4,705,055 | 11/1987 | Rohm et al. | 210/411 |
| 4,844,799 | 7/1989 | Lee | 100/112 |

FOREIGN PATENT DOCUMENTS 2027356 2/1980 United Kingdom ................. 100/112

Primary Examiner—Timothy F. Simone
Attorney, Agent, or Firm—Douglas W. Rudy; Richard B. Megley

[57] ABSTRACT

The spray ring is cycled back and forth along the longitudinal axis of the finisher to allow the high pressure cleaning stream of water or solvent to be directed against the surface of the finisher. A linear rodless cylinder is attached to the spray ring and is sequenced to move the spray ring from one end of the finisher to the other.

5 Claims, 4 Drawing Sheets

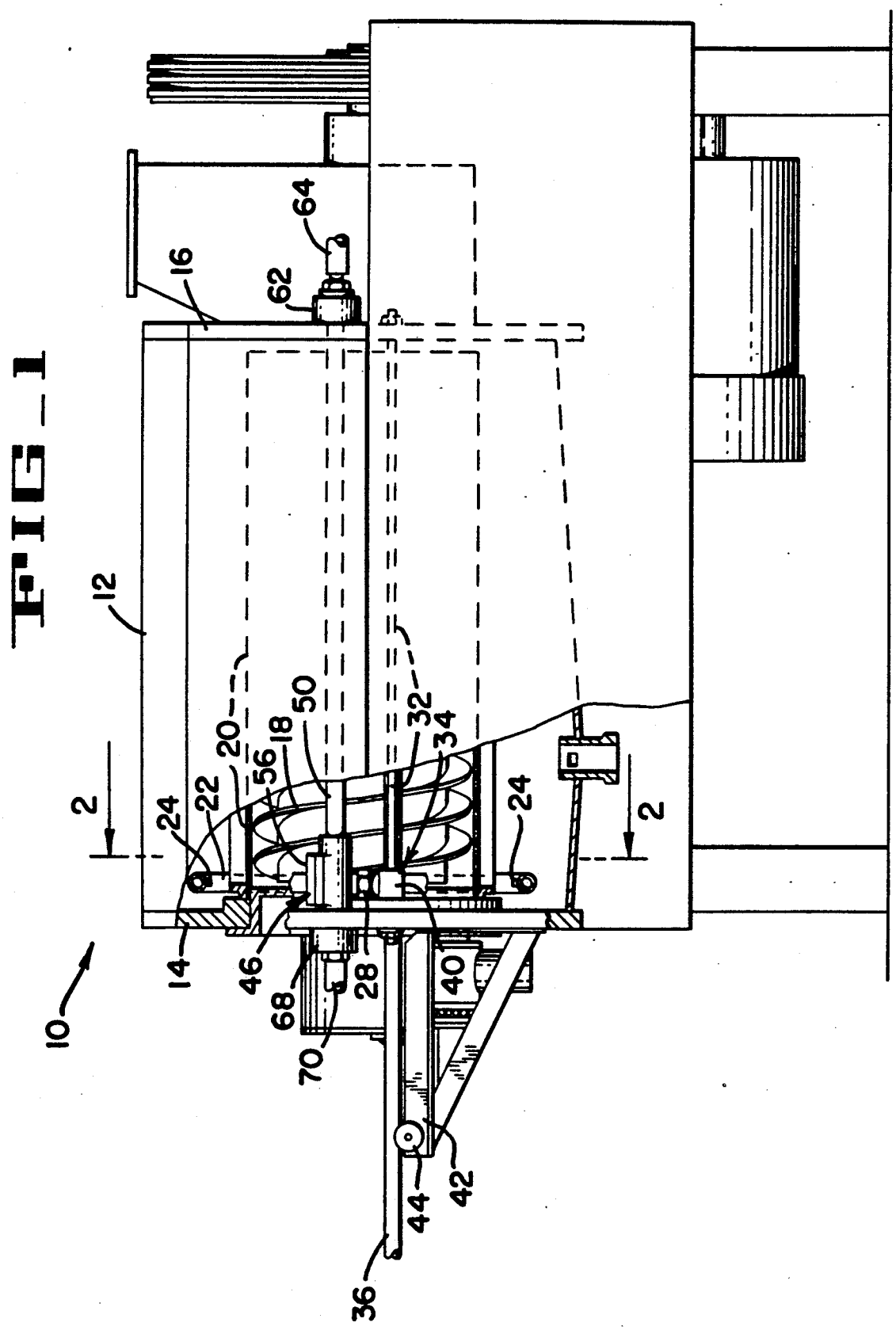

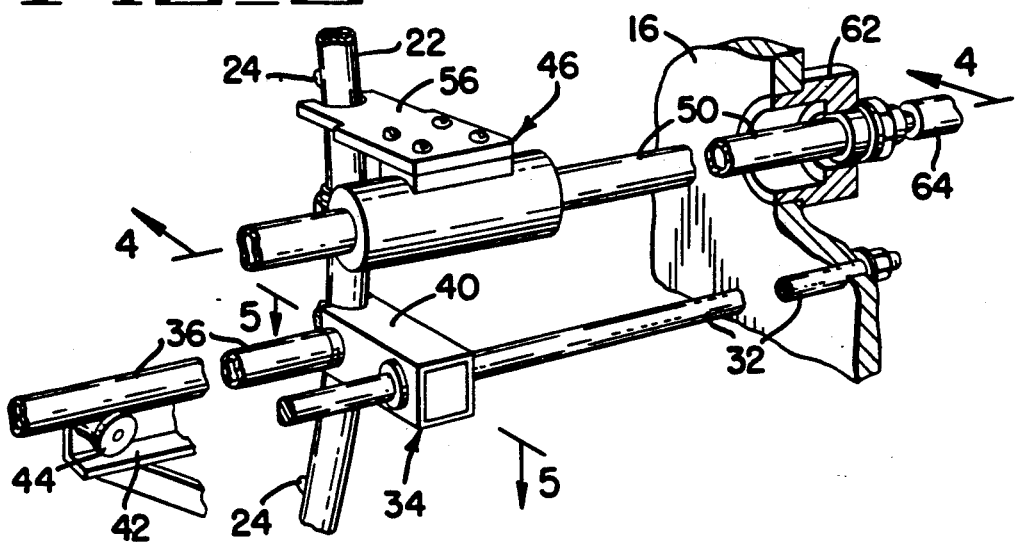
FIG_3
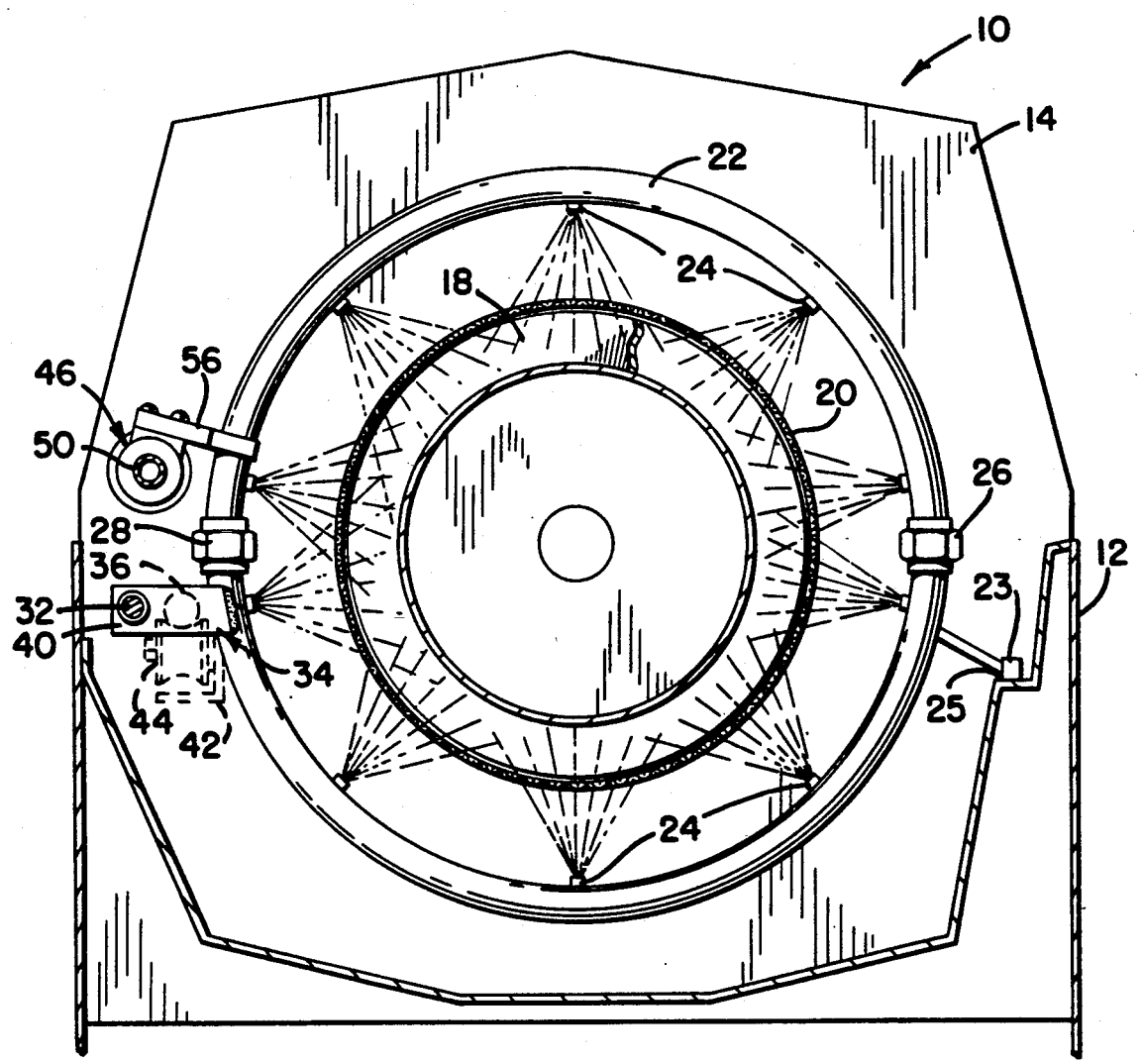
FIG_2

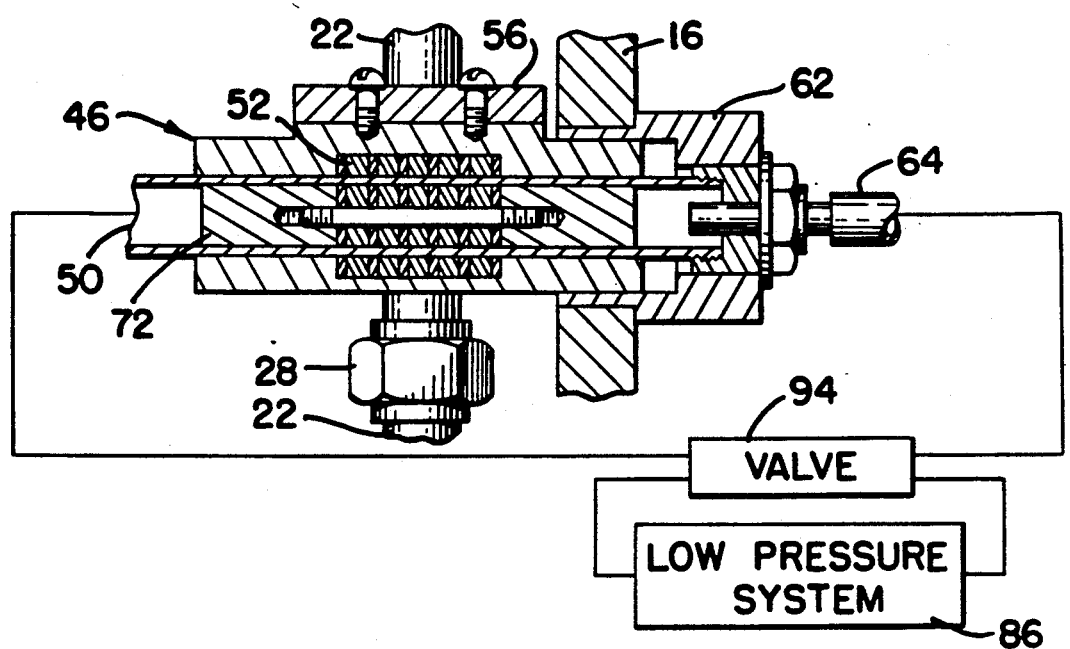
FIG_4
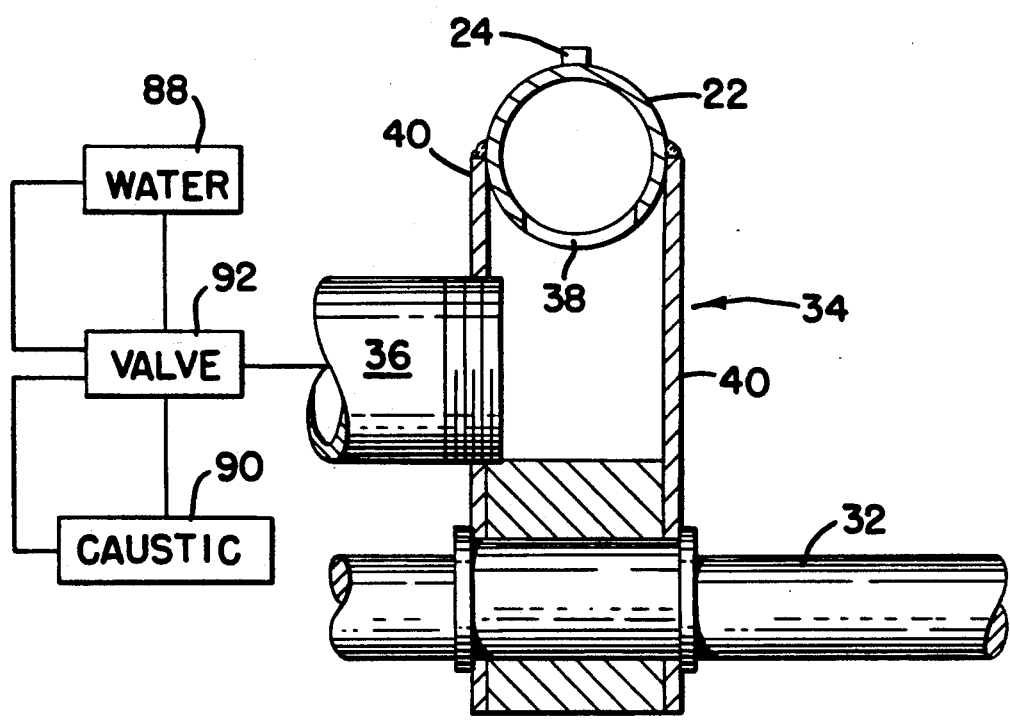
FIG_5

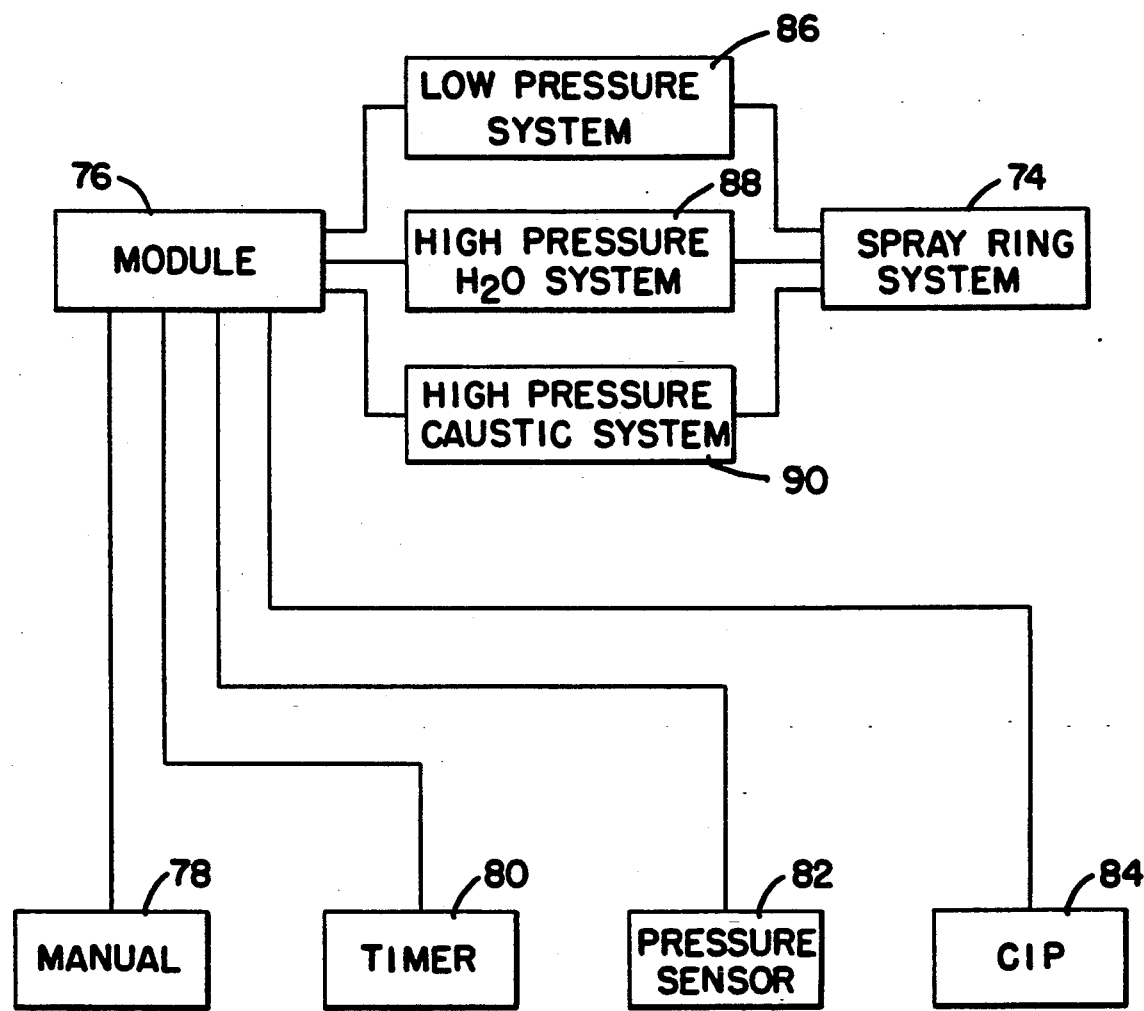

AUTOMATIC SPRAY RING FOR USE IN A JUICE FINISHER

This invention has to do with apparatus that is used in citrus juice processing environments. More particularly this invention has to do with "process finishers" used in the processing of a raw juice stream into a modified juice stream generally including the removal of solids from the raw juice stream.

Raw juice streams resulting from the extraction of citrus juice from citrus fruit contain a pure liquid component and a pulp component. The pulp component contains juice sacs and other solid elements, that contribute to the quality of the juice when juice sacs are present in juice in specific quantities, but could be detrimental to juice quality when juice sacs are present in a finished juice in too great a quantity.

In order to ensure a good quality juice, food development technical experts believe that it is important to remove the undesired pulp from the juice stream. This process of pulp separation, sometimes called a finishing process, may be done by means of a screw type finisher that will force the free juice from the pulp and allow separation of the juice from the fruit by means of interposing a screen between pulp and liquid removed from the pulp. In the process of applying pressure to the pulp to remove the juice, it is essential that the pulp be squeezed until all free liquid is absent without causing the pulp to be extruded through the finisher screen surrounding the internal worm or screw of the finisher. If, and when, an undesirable amount of pulp is extruded through the screen, the ratio of liquid to insoluble solids will decrease causing a degradation in juice quality.

Over a period of continuous processing, which is the normal method of operation, the screen, which is used to serve as a separating device, becomes clogged or "blinded", a term of art in the trade. The pulp will cause blockage of the screen and thus cause a reduction in finisher efficiency. This loss of efficiency causes heat to be generated within the pulp and in the juice stream further degrading juice quality.

To combat this blinding problem various methods of clearing the finisher screen have been proposed and adopted. These methods include hand-held sprayers (a trapdoor panel on the finisher housing would be opened for access) and built in spray headers fixed in position or mounted to be manually moved along the length of the screen. Automatic systems wherein a spray ring is cycled back and forth along the screen of the finisher is also known. The drive for such a unit is a rack and pinion device driven by an electric motor. The most pertinent prior art devices all include some type of sprayers that spray water into the screen to break solids loose so that the solids can be transported to the solids discharge apparatus of the finisher.

A similar method of cleaning the finisher screen is needed and used to clean the screen after product has been run through the finisher and the equipment is to be shut down.

The advantage provided by the instant invention is that the manual screen cleaning methods and the single known automatic method have been superseded or improved by the automatic screen cleaning method and apparatus herein provided.

The specific invention disclosed herein is a spray ring that is provided with a plurality of nozzles to allow a spray of water to be directed to a finisher screen surface. The spray ring is supported on either side thereof by means of a track and slider assembly on one side of the spray ring and on the other side by means of a block having an aperture therein through which a guide/support rod is positioned. A third interface element with the spray ring is provided by a bracket attached to a yoke. The yoke is slidably carried on a hollow stainless steel element in a preferred embodiment. A magnetic piston or slug is carried inside the hollow stainless steel element. Various valving is provided to allow fluid pressure to move the piston along the length of the hollow host tubular element as will be explained further on. The yoke, mentioned above, is a magnetic element that generally surrounds the hollow stainless steel transport track and will be caused to move with the piston by magnetic attraction as the piston is cycled through the hollow stainless steel element, hereinafter a "tube". As the piston moves through the tube the ferrite support yoke and the attached spray ring will follow, as a result of a snap-on drive plate connecting the spray ring to the yoke.

Various valving and timing circuits hereinafter described will direct fluid pumps to move the piston and the spray ring as well as provide high pressure streams of fluid through the spray ring.

The drawings provided herein illustrate the invention in the detail needed for a person having skill in the art to understand the concept and salient features of the invention.

The drawing figures include:

FIG. 1 is a side elevation view of a finisher having some parts broken away and removed to expose the invention;

FIG. 2 is an elevation view taken through 2—2 of FIG. 1 showing one end of the finisher of FIG. 1 having some parts broken away and removed to expose the invention;

FIG. 3 is a simplified view of several components pertaining to the invention;

FIG. 4 is a cross sectional view generally through 4—4 of FIG. 3;

FIG. 5 is a cross sectional view through 5—5 of FIG. 3;

FIG. 6 is a block diagram showing the control system logic of the invention.

In FIG. 1, a juice finisher, generally 10 is provided with an exterior enclosure 12 which is supported by end walls or bulkheads 14 and 16 housing a screen 20 and a screw means 18 of conventional design.

A juice stream of raw juice, that is a stream of juice that has been extracted from a juice extractor, is supplied to the finisher and specifically to the interior of the screen 20. The screw means, here an impeller 18, 3 will urge the solids in the finisher from an input end of the finisher to an output end of the finisher where a discharge means, which may include a metering valve with pressure sensing capabilities, is located.

As is well known, juice and possibly a desired portion of the solids from the raw juice stream will be lightly extruded through the screen 20 and contained in the enclosure 12 as the juice is continuously drained from the finisher.

In the clarification of the raw juice stream the screen can become internally clogged. When the screen becomes clogged or blinded the pressure on the raw juice will increase to the point where it may be detrimental to juice quality. When this happens, and preferably before there is any degradation of juice quality, the invention herein will come into play to unblind the screen and allow the uninterrupted continuation of processing.

Looking at FIGS. 1 and 2 a perforated spray ring 22 having multiple perforations such as 24 for emitting a high pressure stream of cleaning fluid is mounted to surround the screen 20. The perforations may be made directly in the spray ring but the more usual embodiment is the use of spray nozzles that enable controlled high pressure distribution of the spray fluid. The spray ring 22 may be formed from two parts connected together with unions 26 and 28.

The spray ring 22 is supported at several locations. A slider 23 is positioned to slide along a flat ledge 25 and help support the spray ring. A guide bar or guide means 32 runs the length of the finisher and is securely mounted to the end wall bulkheads 14 and 16 thereof. Carried on the guide bar 32 is a manifold connection generally 34 that not only helps to support and guide the spray ring but also is a plumbing fitting that allows cleaning fluid, typically water under high pressure, to be directed from a supply conduit 36 to the spray ring 22. The manifold connection 34 is attached to the spray ring 22 by flanges welded to the spray ring such as 40. The spray ring 22 will have an aperture 38 in FIG. 5, aligned with the interior of the manifold connection so that the cleaning fluid can get into the spray ring as expected.

The supply conduit 36, which may be a solid pipe, a flexible hose or a combination of pipe and hose may be supported on a stand 42 which is equipped with a roller 44. This roller assists the supply conduit 36 in maintaining its alignment with the manifold connection 34 as the spray ring 22 moves horizontally through the finisher.

Further support for the spray ring 22 is provided by the housing or yoke 46 which is dual purpose in that it supports the spray ring 22 and also is the armature that follows a magnet contained in the piston which is carried in the hollow stainless steel tube 50.

FIG. 3 presents a very simplified drawing showing portions of the spray ring and support structure in a projected view for clarity. The part numbers used with this figure are, as usual, the same numbers used to identify the same parts in other figures.

In FIG. 5, which is a view taken through 5—5 of FIG. 3, the passages including a fluid inlet port which receives the supply conduit 36 and a passage terminating in an outlet port, being that portion of the passage walls 40 terminating at the aperture 38 in the spray ring, for getting fluid to the spray ring are shown. The fluid from the supply pipe or conduit 36 enters the chamber 50 formed between the flanges or walls 40 and then into the spray ring 22 through the aperture 38 in the spray ring. The only egress for fluid delivered by conduit 36 is through the nozzles, one shown as 24. The guide bar 32, which is a significant support for the spray ring, is also shown in FIG. 5.

In FIG. 4 the housing 46, as well as ancillary equipment, is shown in a cross sectioned view. It rides on the exterior of the non-ferrous tube 50 and includes a ferrous component 52, which may be an armature of a magnet arranged to encircle the tube 50. A bracket or snap-on drive plate 56, attached to the housing 46 by means of screws 60, encircles the tube and provides support for the spray ring. The snap-on drive plate can be quickly removed from engagement with the spray ring for servicing or for manual operation of the spray ring. This is done by rotating the housing 46 around the tube 50 in the direction away from the spray ring.

The tube 50 extends through both end walls of the finisher and is maintained in position by means of a cylinder mounting cap 62, that is threaded or otherwise fixed to the bulkheads or end walls such as 16. A supply/return tube 64 is also provided. As shown in FIG. 1, a similar mounting cap 68 and a second supply/return tube 70 is provided at the bulkhead 14 section of the finisher.

As stated above piston 72 is carried inside the tube 50 and is slidable therethrough. The piston includes a plurality of magnets such as 74, which when proximate to the ferrous component such as the yoke or magnet housing 46, will cause the yoke to follow the piston as the piston is moved through the hollow stainless steel tube by means of hydraulic pressure supplied to either side of the piston from the supply/return tube 64 and/or 70. This type of rodless linear drive cylinder, using a magnetic coupling, is known in the hydraulic actuator industry. The piston, in the instant invention is moved through the rod or tube 50 by means of fluid pressure accessing the piston through the supply/return tube 64 from either end of the tube 50 depending on the direction that the piston is to be moved through the tube. As the piston moves through the tube the yoke 46 will normally follow the piston and thus the ring 22 attached to the yoke 46 through bracket 56 will also follow the piston. As this association between the piston and the yoke is a magnetic coupling it can be overcome by resistance if the spray ring is inadvertently restrained while the piston continues to move.

Upon initiation of spray ring travel, cleaning fluid, which can be clear water or a caustic or other chemical cleaning solution, will be sprayed at high pressure and significant volume, typically at 450–500 psi and 70–75 gpm, against the surface of the screen. The high pressure fluid will cause the pulp which may be blinding the screen to be forced inwardly away from the interior surface of the screen and thus "unblind" the screen. The cycling of the ring is anticipated to be a normal operation to be done while the finisher is processing a run of raw juice. It is also expected that the finisher will be cycled at the end of a production run when it is desired that the finisher screen be cleaned. The cleaning process of the finisher would include two steps not taken when the spray ring is being cycled along the finisher during production. The extra steps would include a second step which would entail the use of hot (150°-170° F.) cleaning solution and a third step would entail a final water rinse that could contain a sanitizing solution.

Means, such as a fluid control valve responsive to an external input, either normal operation or automatic operation dependent on the pressure build-up in the finisher, is also provided. In operation a source of high pressure fluid would be connected to the spray ring through the supply conduit 36. The supply conduit would be in-line with a two position valve that could be opened or closed normally or by operation of a solenoid. The fluid supply to the rodless cylinder—a fluid at relatively low pressure in the range of 30-40 psi—would be selectively supplied to first one end of the cylinder and then to the second end of the cylinder to move the piston, and the attached spray ring back, to its starting position. A sequencing valve, responsive to a proximity detector or limit switch at each end of the linear cylinder, would be one method of operating a valve in the low pressure fluid supply line to sequence the pressure from one side of the piston to the other and thus move the ring from one end of the finisher to the other end of the finisher. This technology is well known in the art.

FIG. 6 is a block diagram showing the relationships between various elements in the systems. At the heart of the system is a control module 76, which may be a programmable logic controller such as a Cutler-Hammer PLC-5, or other means for processing an input signal and outputting a signal to control a function to be performed by mechanical apparatus. The module 76 can receive signal inputs from a manual input 78, which would typically be a console mounted push button; a timer 80 which is an electronic clock or the like which sends a signal to the module after a preset time period; a pressure sensor 82 and a "clean-in-place" input 84.

The output of the module 76 may direct various signals to a low pressure system 86, a high pressure water system 88 and/or a high pressure caustic cleaning solution system. The three systems are tied into the spray ring system 74.

The spray ring system 74 of FIG. 6 is the system that is responsible for the delivery of unblocking and/or cleaning fluid through the spray ring as it travels the length of the finisher. The spray ring system also controls the direction of travel of the spray ring.

In a simple operating mode an operator of the finisher may desire to cycle the spray ring along the screen of the finisher. He will initiate such action by pressing the switch 78, labeled "Manual" to indicate that the cycle is manually initiated. A signal will be sent to the module 76 which will recognize the input signal as a trigger to take certain actions. First, in one preferred embodiment of the invention, the module will send a signal to the high pressure water system 88 which will be activated. This system will deliver water at high pressure from the high pressure water system 88 of FIG. 5 through a solenoid valve 92(labeled "WATER") which, after receiving a signal from the high pressure water system, will be opened to allow high pressure water to flow into the supply conduit 36 and thereafter to the spray ring 22.

Second, although very close in real time, the module 76 will send a signal to the low pressure system 86 which will activate this system such that the spray ring starts its traverse of the finisher screen. The low pressure system 86 will send a signal to the solenoid operated valve 94 which will open the passage of fluid under pressure to one side of the piston 72 and open the fluid flow passage on the other side of the piston to drain. This will cause the piston to move laterally through the tube 50. The piston will continue to move along the length of the tube until it has reached the other end of the finisher. At this point the solenoid valve will be shifted to reverse the fluid pressure and drain passages which will cause the piston to reverse directions. In a preferred embodiment the travel speed of the piston is preset into the module as a function of time. The spray ring piston travel in one direction until the module times out the time traveled by the piston. At time out the module will send a signal to the low pressure system 86 and/or solenoid 94 valve initiating the movement of the solenoid to allow flow in the other direction. Of course, at the completion of a complete cycle the spray ring can be parked or sent into another cycle depending on the preprogrammed settings in the PLC module.

As explained earlier the spray ring 22 is attached to the yoke 46 which moves with and responsive to the piston 72. Thus the spray ring moves with the piston.

The number of times the spray ring cycles back and forth in response to a signal from the manual input 78 is normally set by the module as one cycle from one end of the finisher to the other end of the finisher and back. When the module has timed out for one complete cycle it will send a signal to close the solenoid valve 94. Alternatively, the solenoid valve could stay in its current position and the pressure on the piston from the last cycle would remain thus ensuring that the spray ring remains at the furthest extend of its travel.

It should be apparent that the low pressure system 86 is simply the system used to move the spray ring back and forth in the finisher. The high pressure system 88 is generally an application of high pressure water sprayed at the finisher screen to unblock the screen.

The timer 80 indicates that the module could be directed from an input from a remote timer or from actuation of a clock integral with the module, with the latter being the more normal situation. The timer would send a periodic signal to the module 76 directing the module to initiate a screen cleaning traverse of the spray ring. The signal from the timer is, as would be expected, the equivalent of the module receiving an initiation signal from the manual input 78. The difference being that the timer operation is automatic, vis-a-vis the actuation of the cycle, whereas the signal from the manual input is just that—an operator initiated manual input. It is expected that the manual input would take precedence over the timer input such that a manually initiated screen cleaning traverse would not have to wait for initiation until the timer times out.

The pressure sensor input 82 is a pressure responsive switch that is mounted in cooperative association with the outlet valve 26 of the finisher. It could be in one of several locations as long as it was mounted to sense pressure in the outlet valve 26.

The pressure sensor 82 will be responsive to pressure in the outlet valve 26. As this pressure increases it will indicate that a blocked condition of the screen is developing. To eliminate this blockage it is appropriate to cycle the spray ring and spray the finisher screen with high pressure water. The signal from the pressure sensor 82 is like the signal from the manual input 78 and the timer input 80 in that it sends a signal to the module 76 to initiate a screen clean. The module 76 will initiate the screen clean as detailed above. The pressure sensor input to the module will override the timer input to the module in that the pressure sensor signal will initiate the module to initiate screen clean even if the timer has not timed out.

The fourth signal input to the module is provided by the clean in place input 84. This input will be activated when there is a significant interruption in the processing of juice. This could be at the end of a production shift or during a shift when the flow of the infeed juice stream is to be interrupted for a length of time greater than acceptable to ensure juice quality.

The clean in place input is similar to the high pressure manual unblocking cycle described above but instead of just a high pressure water spray a high pressure caustic spray would be initiated as well dependent on an output from the module 76.

In the clean in place mode the module will be programmed to respond to and direct various actions by the spray ring. For instance, when a clean in place cycle is initiated the procedure may start with a high pressure clean water rinse or first pass of the spray ring. The second pass could be a high pressure caustic system pass and a third pass could be a high pressure clear water rinse pass. Of course, the low pressure system will be activated as usual to drive the spray ring from a starting point, through the cycle and back to the starting point.

The module also may be programmed to drive the spray ring only a portion of the length of the finisher screen. This is done during processing when it is necessary to only unblock one end of the screen. As can be envisioned, the finisher screen may blind more readily in the discharge area of the finisher therefore an unblinding high pressure water rinse of that portion of the screen would be all that is necessary.

Although only several operation scenarios are described above it is readily apparent that various combinations of system actuations are possible. And with the module programmed appropriately the cycle times and frequency can be set to accomplish various tasks to ensure that the finisher screen can be unblocked as necessary to maintain a high level of finisher efficiency.

The use of the piston 72 inside the tube 50 presents a non intrusive drive means, unlike one prior art device known to the inventor where a rack, of a rack and pinion set, resides right inside the finisher housing. This is a significant advantage over the known prior art.

Thus it can be seen that there has been provided a method for spray washing and unblinding the screen of a screen-type finisher that has the advantages set forth above. The following claims attempt to reserve for the inventor the right to exclude others from making, using or selling the invention disclosed herein or any similar embodiment that is within the scope of the claims.

What is claimed is:

1. In a finisher, having an internal screen supported between end wall bulk heads, for separating pulp from a raw juice stream the improvement comprising:
    a perforated spray ring mounted outboard of the screen of said finisher, said ring encircling said screen and capable of horizontally traversing said screen without contact with said screen;
    a guide means extending horizontally from one of said bulkheads to a second of said bulkheads;
    a fixture carried on said guide means and connected to said perforated spray ring, said fixture having a fluid inlet port and a fluid outlet port allowing fluid to flow from the interior of said fixture to the interior of said spray ring;
    a linear rodless cylinder, having a piston carried in the cylinder, mounted between said end wall bulkheads, said rodless cylinder having a yoke portion supporting a bracket, said bracket connected to said perforated spray ring;
    means for supplying low pressure fluid to said linear rodless cylinder to cause the piston to move linearly;
    means for supplying fluid under high pressure to said spray ring;
    control means for cycling said perforated spray ring longitudinally along the length of said internal screen of said finisher and for supplying high pressure fluid to said spray ring.

2. The invention in accordance with claim 1 wherein said control means for cycling said spray ring is responsive to a pressure buildup inside said finisher.

3. The invention in accordance with claim 1 wherein said control means for cycling said spray ring longitudinally through said finisher is responsive to blockage of the screen of the finisher.

4. The invention in accordance with claim 1 wherein said spray ring is provided with perforations for directing fluid at high pressure from said spray ring to the surface of said screen of said finisher.

5. The invention in accordance with claim 4 wherein said spray ring is moved linearly through said finisher by means of a free piston being driven through a cylinder rod, said free piston magnetically connected to a yoke connected to said spray ring.

* * * * *